United States Patent [19]

Mastran

[11] Patent Number: 4,641,253

[45] Date of Patent: Feb. 3, 1987

[54] PROCESS FOR SYNCHRONIZING COMPUTER VIDEO WITH INDEPENDENT AUDIO

[75] Inventor: David V. Mastran, Great Falls, Va.

[73] Assignee: Maximus, Inc., McLean, Va.

[21] Appl. No.: 617,915

[22] Filed: Jun. 6, 1984

[51] Int. Cl.$^4$ ................. G06F 3/153; G06F 15/44; G11B 31/00

[52] U.S. Cl. ................. 364/518; 364/569; 364/410; 358/149; 358/300

[58] Field of Search ............... 364/518, 521, 569, 410, 364/300; 358/149

[56] References Cited

U.S. PATENT DOCUMENTS

| | | | |
|---|---|---|---|
| 4,296,930 | 10/1981 | Frederiksen | 364/410 X |
| 4,333,152 | 6/1982 | Best | 364/521 X |
| 4,405,984 | 9/1983 | Siegel et al. | 364/410 |
| 4,445,187 | 4/1984 | Best | 364/521 |
| 4,471,464 | 9/1984 | Mayer et al. | 364/900 |
| 4,475,228 | 10/1984 | Vickers | 364/410 X |
| 4,569,019 | 2/1986 | DiOrio et al. | 364/410 |
| 4,569,026 | 2/1986 | Best | 364/521 |

Primary Examiner—Edward J. Wise
Attorney, Agent, or Firm—John S. Hale

[57] ABSTRACT

A process for use of a low-cost personal computer to display video images which provide the effect of animation in synchronization with an audio program, such as voice or environmental sounds, originating independently of the computer. The computer is provided with a data base including intervals between recorded cue tones preceding the audio program, and intervals between video events to be synchronized with the audio program, all such original intervals corresponding to the original recording transport speed of the audio program. While consumer audio playback devices operate at a stable playback transport speed, it is seldom precisely the same as the original recording speed. During playback, the viewer indicates playback intervals between cue tones, for instance by tapping a key of the computer keyboard whenever a cue tone is played. The computer times the actual playback intervals, calculates a ratio R of the playback interval divided by the recording interval, and then executes the video events at playback intervals equal to their original intervals multiplied by R.

16 Claims, 1 Drawing Figure

PROCESS FOR SYNCHRONIZING COMPUTER VIDEO WITH INDEPENDENT AUDIO

BACKGROUND OF THE INVENTION

The present invention relates generally to audiovisual presentation methods and, more specifically, to a method for synchronizing computer-generated video displays with an independent audio source of unknown rate and commencement.

The market acceptance of low-cost personal computers with advanced graphics capabilities has resulted in the placement of versatile video display systems in millions of homes in the United States. Such systems typically offer a video signal generation system which includes redefinable character shapes, high resolution graphics, superimposed moveable objects, or a combination of these widely-recognized and well-understood techniques. For instance, the model VIC-20 computer manufactured by Commodore includes both redefinable character shapes and high-resolution color graphics. This model has sold over a million units in the United States and is currently available for less than $100.00. Other popular systems which include advanced graphics capabilities for home users include the Apple II family, the Radio Shack Color Computer family and the Atari family, all of which are widely available and have found broad acceptance.

These personal computers do not incorporate sound generation capabilities which can produce sounds commonly available from high-fidelity sound reproduction systems. Many of the computers identified above incorporate a tone generator with a frequency control and, in some cases, a selection of predetermined waveforms. However, these devices can only approximate the tone of a musical instrument, and fail to provide satisfactory imitation of a human voice. The ability to imitate multiple voices or instruments simultaneously is wholly absent. Some personal computers additionally include a digital-to-analog convertor which can be utilized to reproduce a digitized human voice, but the cost of random-access memory limits the vocabulary available through this method and prohibits simultaneous graphics presentations. External voice-generation modules are available at a cost which, in some cases, exceeds the cost of the personal computer itself. Thus external modules have found only limited market acceptance.

Because consumer audio equipment has found a very wide acceptance in the past several years, and because a large majority of personal computer owners also own consumer audio equipment, it has also been suggested that the audio portion of an audio visual presentation be provided from an independent audio source such as a tape or disk, and that the instigation and pace of computer-generated video be synchronized with the independent audio track. However, it is well-known that the transport speed of consumer tape and disk equipment, while constant for a given source of constant power, is not precisely the same as the standard speed for such equipment. It can be appreciated that a tape deck which operates at only two percent faster or slower than the standard speed will lead or lag behind a standard-speed video presentation by an interval in excess of two seconds after less than two minutes of operation. Thus it can be appreciated that the common technique of commencing audio presentation, and then manually commencing video presentation at the sound of a cue tone, does not provide sufficient capability for continuous synchronization of computer-generated video with an independent audio track.

Other systems have in the past presented computer-generated video as a sequence of still images, with a cue tone provided at intervals in the audio track to prompt manual advancement of the video images. This is analogous to the well-known method of operating photographic slide projectors, and incorporates similar deficiencies of continuous manual operation and lack of the illusion of animation.

Atari had provided a stereo tape drive for its model 400 and 800 personal computers. On one track of this tape, voice and other human understandable audio could be recorded in synchrony with timing pulses, software or data information on a second track. The tape drive was coupled to the computer so that the computer supplied regulated power to the recorder, and sensed the data track. The sound track was coupled through the radio-frequency modulator of the computer system so that a television receiver could receive both the computer visual presentation and the independent audio track. This system essentially permitted elimination of the human in the loop but required a purchase of the Atari recorder unit, which duplicated the function and capital commitment represented by consumer audio gear already in the hands of the computer owner in most cases.

Other distinct problems arise where the visual presentation is made through means other than a personal computer. In the field of motion picture projection, many methods have been set forth for controlling the film transport and shutter mechanism to coordinate an independent sound source with a film projector. Where the image source is a television camera system, a variety of methods have been set forth for delaying an independent audio track to match video delayed through a frame storage unit or other means for synchronization with other video sources.

In this latter category, one example is U.S. Pat. No. 4,218,705 which discloses an audio synchronization system in a television relay arrangement along a line of television stations. Each station delays the video signal by a time less than or equal to the known frame interval and sufficient to synchronize the same with its own internal video operations, and thereafter relays the delayed signal to the next station in the chain. While the delay at an individual station may be less than or equal to the known interval, adjustment of an audio delay interval to equal a multiple of the known interval nearest to the cumulative video delay provides an error in synchronization which as inperceptable to the viewer. A similar system is revealed in U.S. Pat. No. 4,313,135 in which the input video arrives in synchrony with input audio at a station in the chain. A video processing device delays the output video by a fluctuating delay interval at the station. The system compares input video and output video to determine on a continuing basis the fluctuating delay interval, and then varies the performance of an audio delay system to delay output audio by an equal interval. Thus output video and output audio remain synchronized.

U.S. Pat. No. 4,040,088 discloses a system for audiovisual presentations based on a single audio track carrying both audio and video information. While the audio information is a typical analog recording, the video information comprises a plurality of message packets, each of which has a recognizable identifier preamble, a screen address and a character shape or code recorded in binary frequency shift key form. The length and pattern of the preamble is chosen so that it exceeds the maximum likely length of any similar tone in the analog audio information. A preamble detector recognizes each incoming message packet and decouples a audio amplifier from the audio information until the message packet reception is completed. A memory mapped video graphic subsystem is updated according to each received message packet, so that information comprising text or graphics can be displayed in synchrony with accompanying audio information. In a single-channel simultaneous signal mode, the system provides a demultiplexer which separates the message packets from audio information so that the audio amplifier may remain constantly coupled and the resulting presentation is more closely synchronized. However, this system is clearly limited by the bandwidth of audio gear so that normal screen image updating is too slow for detailed animation of the kind contemplated by the present invention.

All of these prior art systems pose a serious financial disadvantage for the typical consumer who already owns both audio gear and a personal computer, because all of the prior art require the acquisition of additional hardware at substantial expense. In many instances, the prior art deals only with correction of an interval delay, while presuming that the audio signal speed is precisely synchronized with an independent video frame rate. As stated above, this presumption does not hold for consumer audio equipment which is already in the hands of personal computer users. Therefore, it can readily be appreciated that there exists a need for an alternative low-cost method of synchronizing computer-generated video displays with an independent audio track of unknown speed and commencement.

SUMMARY OF THE INVENTION

The present invention provides a low-cost process for synchronizing the commencement and rate of a computer-generated video display with an independent audio sound track. The sound track may be delivered from any well-known conventional audio source such as, for example, phonograph disks, compact disks, cassette tape or open-reel tape. It has been found that the present inventive process works acceptably well with inexpensive portable tape players available from sources such as Radio Shack, General Electric and others. While gear which exhibits lower transport speed variation is somewhat more expensive, it is nonetheless very commonly found in the hands of personal computer owners and provides excellent results according to the present inventive process. A variety of personal computers may be utilized according to the present invention, such as those mentioned above, all of which are widely available and have found broad acceptance in the market place.

According to the present inventive process, a general-purpose programmable digital computer with video output is utilized to prompt the viewer to initiate an independent audio sound track which is not under the control of the computer. The user is then prompted to strike a key of the computer keyboard when a cue tone is provided by the audio sound track. This action in response to a cue tone is repeated at least once and preferably more than once, at intervals in excess of thirty seconds. The computer measures the time interval between each keystroke and thereby determines the operating speed of the audio track, while the occurence of each stroke allows determination by the computer of the commencement of the track. The computer then updates the video presentation to provide the illusion of animation at a rate corresponding to that of the audio track beginning at a time period corresponding to an interval between a final cue tone and commencement of presentation audio. To improve the physiological response accuracy of the viewer, it is preferable to record a packet of three cue tones at intervals of one-half second, and instruct the viewer to strike a key at the third tone; the process then measures the interval between packets. Physiological response accuracy of one-sixtieth second is commonly achieved in this manner. The present method provides an acceptable synchronization over a period in excess of seven minutes for lowest-cost portable cassette tape players, and in excess of fifteen minutes for higher-cost consumer audio equipment. The present invention clearly accomplishes its aims without the need for any additional hardware or the corresponding capital outlay.

These and other objects and advantages of the present inventive process will be made more readily apparent by reference to the following detailed description thereof, together with the drawings appended hereto.

DETAILED DESCRIPTION OF THE DRAWINGS

Figure 1:
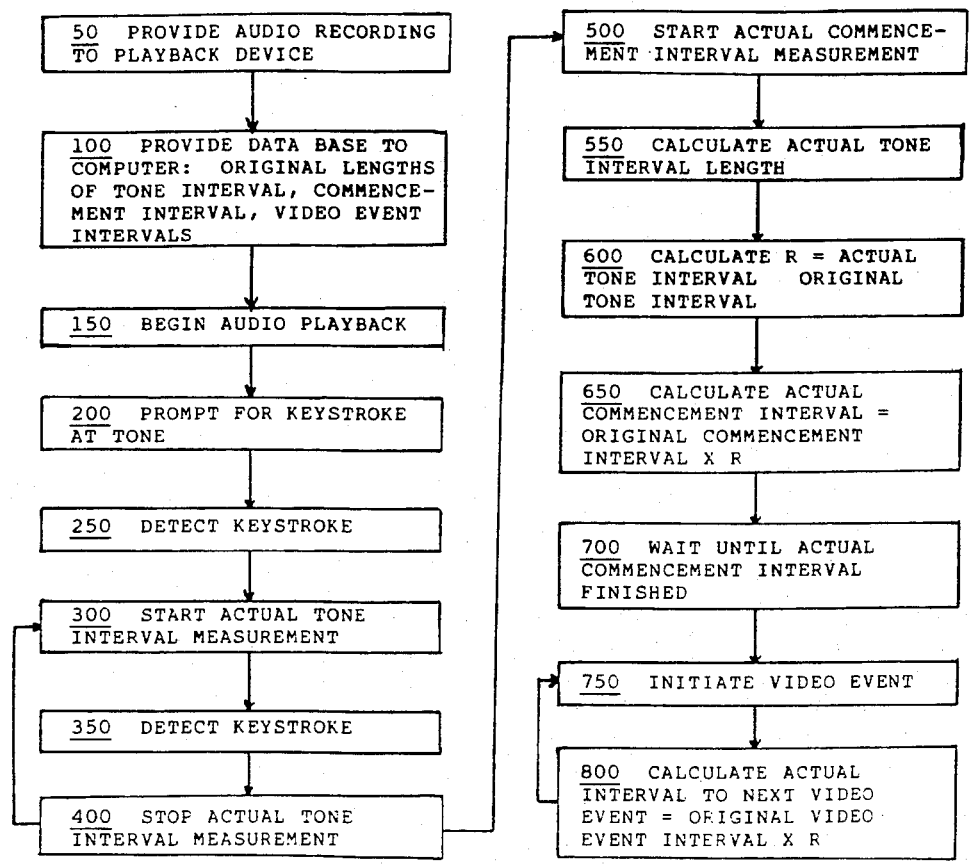
FIG. 1 is a flow chart of steps conducted according to the present inventive process.

The best mode and preferred embodiment of the present invention is illustrated in the single FIGURE, and a listing of computer software embodying the present inventive process is attached hereto. Referring to the FIGURE, the process is begun at step 50 by providing an audio recording to an audio playback mechanism such as a phonographic disk player, a compact disk player, an open-reel tape player, a cassette tape player or any independent audio playback device. The audio recording begins with a series of cue tones recorded at known intervals, and preferably packets of cue tones recorded at known intervals, each interval in excess of one second and preferably thirty seconds in length. The final cue tone is followed by a commencement interval of known length, after which audio program material is recorded. Because the term "program" is used by some to indicate computer instructions and by others to indicate audio-visual information, within this disclosure the term "program" will take the latter meaning while the term "software" will take the meaning of computer instructions.

In step 100, several items of information are provided to a general purpose programmable digital computer with video graphics capabilities. These items include the number of intervals between cue tones or packets recorded on the audio recording, the lengths of the intervals between the cue tones, the commencement interval between the final cue tone and audio program, and the time intervals $I_n$ between consecutive video events displayed by the computer, all at the transport speed at which the recording was produced. The intervals $I_n$ are those which would be utilized in presentation of video program by the computer if the audio playback device operates at precisely the standard speed at which the audio recording was recorded.

In step 150, the audio playback device is started, so that the first of the cue tones or packets on the audio recording is heard. In step 200, the user is prompted to strike a key on the typewriter-style keyboard of the computer, precisely when a cue tone is heard. If cue tone packets are used, then the user is instructed to strike a key when the final tone in each packet is played. This instructional information may be provided either by the audio program, or by the computer video program, or by both. Alternately, any type of human-controlled input could be prompted, although only the keyboard is universally supplied with personal computers at present. A specific key may be designated, or any group of keys. In step 250, the computer determines that a key has been struck by the user. This step may be implemented by either of the well-known techniques of scanning the keyboard at frequent intervals, or interrupting a program loop when a key has been struck.

In step 300, when an appropriate key has been pressed to indicate that an initial cue tone or packet has been played, the computer begins measuring a time interval. In step 350, the computer again waits for an appropriate keystroke, and in step 400 when an appropriate key is pressed the computer recognizes completion of a time interval between consecutive cue tones and records the length of that interval. If more than two cue tones or packets are placed on the audio recording, then the keystroke which indicated the end of the actual interval also indicates the beginning of a subsequent actual interval, and so steps 300 through 400 are repeated for each subsequent cue tone or packet, up to a limit indicated by the cue tone interval count provided previously in step 100. Preferably, each actual interval between cue tones or packets is measured and committed to memory by the computer separately.

Following the final repetition of step 400, the computer begins measurement of the actual commencement interval in step 500. In step 550, the computer calculates the sum of the intervals recorded in step 400 and divides that sum by the number of intervals to calculate the average actual interval length. The advantage of using the total interval from first cue tone to final cue tone is that the total error introduced by the user in striking the key early or late, as a fraction of the total interval, is minimized. In step 600, the computer calculates a ratio of the average actual interval length divided by the standard interval length previously provided in step 100. This ratio, indicated herein as R, will be less than 1 if the playback device is operating faster than the standard, and greater than 1 if the playback device is operating slower than the standard.

In step 650, the standard commencement interval is multiplied by R to calculate the actual commencement interval. In step 700, the computer waits until the actual commencement interval as calculated in step 650 is completed. In step 750, the computer initiates the first of the sequence of video events $I_n$ in the video program at the termination of the actual commencement interval calculated in step 650. Finally, in step 800, each standard interval $I_n$ is multiplied by R to calculate the actual event interval, and the events are executed by the computer at the actual event interval so calculated by repetition of steps 750 and 800 a number of times equal to the number N of video events.

Additionally, the present inventive process can evaluate the quality of the viewer's response in striking the appropriate key at the cue tones. To this end, step 100 may additionally comprise providing upper and lower response time limits, which may be expressed as ratios, and which exceed the typical playback speed variance from the standard speed at which the audio recording was recorded. Step 400 then additionally comprises calculating a ratio between the actual measured interval and the standard interval, and prompting the user for better performance if the ratio exceeds the variance limits provided in step 100. The standard audio interval provided in step 100 may then be equal to the full interval from the first cue tone to the final cue tone, and the ratio R is computed in step 600 by dividing the total actual interval by the standard interval from first cue tone to final cue tone.

The present inventive process has been implemented on a Model 64 Computer from Commodore, in conjunction with a Model 1541 Diskette Drive from the same manufacturer. This particular computer incorporates a radio frequency modulator which may operate to transmit a video signal on Channel 3 or 4 in the United States, selectable by the user. Thus any television receiver may be utilized together with the computer in order to perceive the result of the present invention.

The implementation was prepared through use of Commodore Basic, which is available on a turnkey basis in read-only memory with the Model 64, and with machine-language routines written in assembly language for the Type 6510 Central Processing Unit of the Model 64. The type 6510 uses the same instruction set as the widely-utilized and well-understood type 6502 Central Process Unit. The particulars of Basic and machine-language as implemented on the Model 64 may be better understood by referring to the publications from Commodore entitled Commodore 64 Users Guide and Commodore 64 Programmers Reference Guide.

The Commodore 64 incorporates high-resolution graphics capability, superimposed moveable objects, and redefinable character graphics. These factors may be better understood by referring to the Programmers Reference Guide noted above. The Commodore 64 also incorporates two type 6522 complex interface adapter integrated circuits. Each 6522 circuit provides a setable time-of-day clock with one tenth second resolution and alarm option, as well as a 16-bit countdown timer with a one-microsecond resolution. With the time-of-day clock with alarm or the countdown timer in use, a processor interupt may be optionally generated when the alarm time occurs or the countdown timer reaches zero. Alternatively, the system processor may repeatedly scan either function to determine if a particular value has been reached.

In normal turnkey operation of the Commodore 64, one of the countdown timers is utilized to generate an interrupt every one-sixtieth second in order to scan the keyboard and certain other asynchronous input and output functions. The interrupt service routine provided by Commodore in read-only memory of the computer additionally updates a section of random-access memory utilized as a time-of-day clock known as a "jiffy" clock. Many of these clocks may be utilized in accordance with the process of the present invention.

In situations where a particular computer model is not delivered with independent internal clocks of sufficient resolution for use according to the present invention, it is a well-known and widely recognized techique to create processor delay loops of known precise time length, based on numbered iterations multiplied by the number of system clock cycles utilized per loop iteration. At the end of each loop, a random-memory location is incremented or decremented until a predetermined value is reached. Such a timing technique is equally useful for implementation of the present invention as the hardware or interrupt-driven techniques decribed above which are available in the Commodore 64.

A listing of a computer program package implementing the present inventive system on the Commodore 64 is attached hereto following this description and preceding the claims. The first Basic program loads several data files and program files from diskette, instructs the viewer to start the audio playback device, measures actual cue tone intervals as indicated by the viewer, and reports when the viewer response exceeds limits of audio media transport speed variability. This provides training experience for the neophyte viewer. The second Basic program is then chain-loaded and executed. It also loads several data files and program files from diskette, measures actual tone intervals as indicated by the viewer, and executes a sequence of video graphics events at actual intervals calculated as described above.

However, the present description, listing, and drawings are only exemplary of the present inventive system and do not serve to limit the same. In particular, the steps of the present inventive process may be interchanged and are equivalent. Those familiar with the art will recognize that the invention may be carried out in other ways without departing from the true spirit and scope of the following claims.

```
1 PRINTCHR$(147)

5 POKE53280,0:POKE53281,0

10 ONLF GOTO20,25,27,35,40,45,46,48,49,50,130 :REM

INCLUDES LOGO MUSIC

20 LF=2:REMPOKE46,64:POKE48,64:POKE50,64

22 LOAD"RAMIRQ",8,1

25 LF=3:LOAD"DBLCHAR",8,1

27 SYS50900:SYS50618

30 LF=4:LOAD"WORDS",8,1

35 LF=5:LOAD"MAXIMUS",8,1

40 LF=6:LOAD"RAM2",8,1

45 LF=7:LOAD"TEXT1",8,1

46 LF=8:LOAD"LOGO.DAT",8,1

48 LF=9:LOAD"LMUS.0",8,1

49 LF=10:LOAD"BMUSIC",8,1

50 POKE50861,160:REM LIGHT RED

60 POKE56578,PEEK(56578)OR3

65 POKE56576,(PEEK(56576)AND252)OR2

70 POKE53272,(PEEK(53272)AND15)OR48

75 POKE53272,(PEEK(53272)AND240)OR8

80 POKE53265,PEEK(53265)OR32

82 POKE49750,91:REM LINES OF TEXT
```

```
85 POKE53270,PEEK(53270)OR16
86 POKE51046,6:REM SPEED OF SCROLL
87 POKE51047,0:SYS32768:SYS50176
90 SYS33021: SYS51000
91 POKE56334,PEEK(56334)AND254
92 POKE788,49:POKE789,234
93 POKE56334,PEEK(56334)OR1
95 IFPEEK(51047)=1THEN115
100 IFPEEK(51047)=2THENFF=3
115 POKE53265,PEEK(53265)AND223
116 Q=10
117 SYS21000:FORI=24856TO24863:POKEI,PEEK(I-24):POKE
I-24,0:NEXTI
120 POKE648,76:PRINTCHR$(147)
125 IF FF=3GOTO510
128 LF=11:LOAD"HANDPRINT",8,1
130 S=54272:FORL=STOS+24:POKEL,0:NEXT
135 POKES+5,12:POKES+6,0:POKES+1,25:POKES,160
139 PRINT CHR$(154) :REM BLUE
140 PRINTSPC(4)"&´↑←LM().∕BC$%JK♠♠Z[↑←,-RSJK&´":REM
 SOFTWARE MOVIES
142 PRINTSPC(40)"FG↑←Z[#!*+&´23Z]FG♠♠&´↑←*+Z]HI()
$%BCFGVW"
143 REM COMPUSYNC SOUNDTRACK
145 PRINTSPC(82)"■LM↑←$%♠♠()PQJK♠♠&´↑←*+Z]HI()$%B
CFGVW"
147 PRINTSPC(44)"()↑←♠♠.∕↑←$%VW♠♠#!$%↑←#!JK$%XY23
"
151 PRINTSPC(41)"()BC#!♠♠()PQJK♠♠&´#!BCFGJKDEBC$%
♠♠↑←Z]"
```

```
153 PRINTSPC(46)"()PQJK♣♣()PQRS$%HI♣♣()↑←ZJJK":REM
TAP SPACEBAR ON THIRD TONE

155 PRINTSPC(83)"⌧./↑←*+XYHI♣♣23↑←*+♣♣XYRSVWJK♣♣(
)↑←":REM WOULD YOU LIKE TO

157 PRINTSPC(42)"&´JKJK♣♣BC♣♣HIJKZ[↑←"♣♣23♣♣↑←$%
♣♣Z]":REM SEE A DEMO?

164 GETANS$:IFANS$="Y"THEN240

165 IFANS$="N"THEN175

170 GOTO164

175 PRINTSPC(122)"⌧RSZ]&´JK$%()♣♣⌧FGBC&´&´JK()()J
K":REM INSERT CASETTE

180 PRINTTAB(6)"⌧&´RSHIJK♣♣BC♣♣♣♣*+#!"

181 REM SIDE A UP

185 PRINTSPC(122)"⌧$%JK./RSZ]HI⌧♣♣FGBC&´&´JK()()J
K":REM REWIND CASETTE

195 PRINTSPC(122)"#!$%JK&´&´♣♣⌧#!XYBC23⌧":REM PRE
SS PLAY

200 PRINTTAB(6)"()PQJKZ]♣♣./BCRS()":REM THEN WAIT

205 PRINTSPC(122)"()BC#!♣♣&´#!BCFGJKDEBC$%⌧♣♣↑←Z]
":REM TAP SPACEBAR ON

210 PRINTTAB(6)"()PQRS$%HI♣♣()↑←ZJJK":REM THIRD T
ONE

211 REM THIRD TONE FROM

212 PRINTTAB(6)"LM$%↑←Z[♣♣⌧$%JKFG↑←$%HIJK$%⌧":REM
FROM RECORDER

215 PRINT SPC(160)

218 FORD=0TO40*Q

219 GET A$

220 IFA$<>""THENPRINTTAB(2)"⌧./BCRS()♣♣LM↑←$%♣♣$%
```

```
JKFG↑←$%HIJK$%":REM WAIT FOR
229 NEXTD
230 SYS21100
235 GOTO 500:REM LOAD MOVIE
240 PRINT CHR$(147)CHR$(145)
245 PRINTTAB(4)""
246 REM SPACEBAR LESSON
250 PRINTSPC(84)"[]()BC#!♠♠&'#!BCFGJKDEBC$%♠♠↑←Z]"
251 REM TAP SPACE BAR ON
255 PRINTTAB(9)"[]()PQRS$%HI[]♠♠()↑←Z]JK"
256 REM ON THIRD TONE
260 PRINTSPC(43)"./BC()FGPQ♠♠HIJKZ[↑←♠♠LMRS$%&'()"
261 REM WATCH DEMO FIRST
265 PRINTSPC(52)"♠♠♠♠||||||-♠♠♠♠♠"
270 PRINTTAB(12)"♠♠♠♠|⁻|⁻|-♠♠♠♠♠"
275 PRINTTAB(12)"♠♠♠♠|||⊦∨♠♠♠♠♠"
280 PRINTTAB(12)"♠♠♠♠|L∨♠♠♠♠♠♠♠"
285 PRINTTAB(12)"♠♠♠♠⌐♠♠♠♠♠♠♠♠♠"
290 PRINTTAB(12)"♠♠♠♠⌐♠♠♠♠♠♠♠♠♠"
295 PRINTTAB(12)"[]&'#!BCFGJKDEBC$%"
296 PRINTTAB(12)"[]♠♠♠♠♠♠♠♠♠♠♠♠♠[]"
297 POKES+24,15
298 FORD=0TO20*Q:NEXTD
300 SYS20480:POKES+24,0
301 GOTO 400:REM WANT TO WATCH AGAIN?
305 RESULT=PEEK(20748)+100*PEEK(20749)
306 IFRESULT=0THEN RESULT=600
310 IFRESULT<480THENQQ=0:  GOTO331
```

```
320 IFRESULT>540THENQQ=0:    GOTO340
325 PRINTSPC(53)"▥#!JK$%LMJKFG()▨":REM PERFECT :Q
Q=0
326 PRINTSPC(82)"▨./BCZ]()♠♣Z[↑←#%JK♣♠#!$%BCFG()R
SFGJK"
327 PRINTTAB(12)"23♣♣↑←#%♣♣Z]♣♣" "▪"
328 GETANS$:IFANS$="Y"GOTO450
329 IFANS$="N"GOTO175
330 GOTO328
331 PRINTSPC(45)"()BC#!#!JKHI♣♣()↑←↑←♣♣▨&′↑←↑←Z]▨
"
332 REM TAPPED SPACEBAR TOO SOON
335 GOTO 400
340 PRINTSPC(46)"()BC#!#!JKHI♣♣()↑←↑←♣♣▨%YBC()JK▨
"
341 REM TAPPED SPACEBAR TOO LATE
345 GOTO 400
400 PRINTSPC(81)"./BCZ]()♣♣()↑←♣♣./BC()FGPQ♣♣BCNO
BCRSZ]"
401 REM WANT TO WATCH AGAIN
405 PRINTTAB(12)"23♣♣↑←#%♣♣Z]♣♣" "▪"
406 REM Y OR N ?
407 GETANS$:IFANS$="Y"THENGOTO 240
408 IFANS$="N"THEN 425
409 GOTO407
425 PRINTCHR$(147)
430 PRINTSPC(82)"↑←√⊔♣♣()$%23♣♣RS()♣♣23↑←*+#%&′JK
XYLM"
431 REM OK TRY IT YOURSELF
```

```
435 POKES+24,15:FORD=0TO10*Q:NEXTD
440 SYS20480:POKES+24,0
445 GOTO305
450 IFQQ=0THENQQ=1:GOTO425
455 QQ=0:GOTO400
500 PRINTCHR$(147)SPC(247)"█XY↑←BCHIRSZJNO♠♠Z[↑←,
-RSJK"    :REM LOADING MOVIE
502 PRINTSPC(43)"█&´BCZ[♠♠NO↑←JK&´♠♠()↑←♠♠&´FGPQ↑
←↑←XY"
503 PRINTSPC(125)"█()BC#!♠♠&´#!BCFGJKDEBC$%♠♠↑←Z]
"
504 PRINTSPC(44)"█()PQRS$%HI█♠♠()↑←Z]JK♠♠BCNOBCRS
Z]"
505 GOTO600
510 PRINTCHR$(147)SPC(168)"█XY↑←BCHIRSZJNO♠♠NOBCZ
[JK&´":REM LOADING GAMES
515 PRINTSPC(210)"█&´()$%JKJK()FG$%↑←&´&´":REM ST
REETCROSS
516 PRINTSPC(90)"█PQRSHIHIJKZ]./↑←$%HI&´":REM HID
DENWORDS
520 PRINTSPC(212)"█NO↑←↑←HI♠♠XY*+FGVW"
525 LOAD"STEST.WOW",8
600 LOAD"MOVIE",8
10 REM------ SCHOOL MOVIE ------ 5/29/84
20 ON I GOTO 40,50,60,70,80,90,100,110,120
30 I=1:LOAD"COMBINED.DAT",8,1
40 I=2:LOAD"MOUTH.DAT",8,1
50 I=3:LOAD"SCHSPRITES",8,1
60 I=4:LOAD"WIDE.SET",8,1
```

```
70 I=5:LOAD"SCHMMUS.DAT",8,1

80 I=6:LOAD"MUSC000.0",8,1

90 I=7:LOAD"MLROUTINES.OBJ",8,1

100 I=8:LOAD"ALTMAIN",8,1

110 I=9:LOAD"MAINIRQT",8,1

116 DATA 330,1315,2560,2950,4924,5950,6060,6840,8
480,9540,9940,10500,10800

118 DATA 11100,0,0,0,0,0,0,0,0,0,0,0

120 SC=51200

130 CR=55296

140 KA=57344

150 SX=53248

160 SY=53249

170 SP=52216

180 SZ=192

190 R1=32795

200 R2=32797

210 R3=32799

220 R4=32801

230 R5=32802

240 R6=32804

250 J1=32768

260 J2=32771

270 J3=32774

280 J4=32777

290 J5=32780

300 J6=32783

310 J7=32786

311 MO=49155
```

```
312 MF=49158
313 MS=49172
320 REM
330 REM----------INITIALIZE----------
340 GOSUB 1030
342 POKE 49170,103
344 SYS 49152
350 POKE 56578,PEEK(56578)OR3
360 POKE 56576,(PEEK(56576)AND252)OR0
370 POKE 53272,(PEEK(53272)AND15)OR32
380 POKE 53272,(PEEK(53272)AND240)OR8
390 POKE 648,200
400 POKE 53270,PEEK(53270)OR16
410 I=51816
420 HI=INT(I/256)
430 LO=I-HI*256
440 POKE R2,LO
450 POKE R2+1,HI
460 I=55912
470 HI=INT(I/256)
480 LO=I-HI*256
490 POKE R3,LO
500 POKE R3+1,HI
510 S=0
520 POKE SX+37,0:POKE SX+38,10:POKE SX+39,2
530 GOSUB 3600
550 REM
560 REM------MAIN LOOP TO SHOW SCREENS---
570 S=S+1:IF S>14 THEN S=1:RESTORE
```

```
580 ON S GOSUB 600,610,600,610,620,600,620,630,62
0,630,620,610,600,640
590 GOTO 570
600 GOTO 1250
610 GOTO 1590
620 GOTO 1790
630 GOTO 2870
640 GOTO 3090
650 REM
660 REM--------POKE AND TRANSFER--------
670 HI=INT(QR/256)
680 LO=QR-HI*256
690 POKE 174,LO
700 POKE 175,HI
710 HI=INT(DE/256)
720 LO=DE-HI*256
730 POKE 176,LO
740 POKE 177,HI
750 HI=INT(I/256)
760 LO=I-HI*256
770 POKE R1,LO
780 POKE R1+1,HI
790 RETURN
800 REM
810 REM----------8 BIT TIMER------------
820 POKE R4,TX
830 SYS J1
840 RETURN
850 REM
```

```
860 REM---------CHANGE COLORS---------
870 POKE 53280,C1:POKE 53281,C2:POKE 53282,C3:POKE 53283,C4:RETURN
880 POKE R5,C5:POKE R5+1,C6:RETURN
890 REM
900 REM------DETERMINE WHICH SPRITE----
910 PN=2:IF INT(LL/4)=LL/4 THEN PN=1:RETURN
920 IF INT(LL/2)=LL/2 THEN PN=3
930 RETURN
940 REM
950 REM-----REVERSE STOPLIGHTS---------
960 POKE 51376,C2:POKE 55472,C1
970 POKE 51416,C2:POKE 55512,C1
980 POKE 51384,C4:POKE 55480,C3
990 POKE 51424,C4:POKE 55520,C3
1000 RETURN
1010 REM
1020 REM---------TURN SCREEN OFF---------
1030 POKE 53265,PEEK(53265)AND239:PRINT CHR$(147)CHR$(8):POKE SX+21,0:RETURN
1040 REM
1050 REM
1060 REM---------TURN SCREEN ON---------
1070 POKE 53265,PEEK(53265)OR16:RETURN
1080 REM
1090 REM-------- BLINK EYES ------------
1100 POKE 51497,103:POKE 51498,103:POKE 51499,103:POKE 51502,103:POKE 51503,103
1110 POKE 51504,103:T%=3:GOSUB 820:POKE SX+21,0
```

```
1120 POKE 51537,121:POKE 51538,103:POKE 51539,122
:POKE 51542,121:POKE 51543,103
1130 POKE 51544,122:T%=3:GOSUB 820
1140 POKE 51577,123:POKE 51578,103:POKE 51579,124
:POKE 51582,123:POKE 51583,103
1150 POKE 51584,124:T%=9:GOSUB 820
1160 POKE 51577,54:POKE 51578,112:POKE 51579,55:POKE
 51582,54:POKE 51583,112
1170 POKE 51584,55:T%=3:GOSUB 820
1180 POKE 51537,52:POKE 51538,112:POKE 51539,53:POKE
 51542,52:POKE 51543,112
1190 POKE 51544,53:T%=3:GOSUB 820:POKE SX+21,3
1200 POKE 51497,50:POKE 51498,50:POKE 51499,50:POKE
 51502,50:POKE 51503,50
1210 POKE 51504,50
1220 RETURN
1230 REM
1240 REM-----------MAX---------------
1250 C5=14:C6=9:GOSUB 880
1260 QR=40032:DE=KA:I=2048:GOSUB 660:SYS 32774
1270 QR=45152:DE=SC:I=1000:GOSUB 660:SYS 32777
1280 C1=0:C2=0:C3=8:C4=2:GOSUB 870
1290 POKE IB+19,1:POKE IB+31,0:POKE IB+30,0:POKE
IB+1,0:POKE IB,0
1300 POKE SX+16,0:POKE SX,160:POKE SX+2,200:POKE
SY,106:POKE SY+2,106
1310 POKE SX+21,3:POKE SX+28,0:POKE SX+29,0:POKE
SX+23,0
1320 POKE SX+39,5:POKE SX+40,5:REM--GREEN EYES
```

```
1330 PN=25:POKE SP,SZ+PN-1:POKE SP+1,SZ+PN-1
1340 FOR I=0 TO 100:POKE 51810+I,PEEK(51810+I)+12
8:NEXT I
1350 GOSUB 1070:IF S<>3 THEN SYS MF:POKE MS,2:SYS
 MO
1370 GOSUB 1100
1380 IF S>1 THEN 1430
1390 WAIT IB+23,127,0
1400 POKE IB+23,0
1410 X=INT(TM%(S)/256)
1420 POKE IB+24,X:POKE IB+25,TM%(S)-X*256
1430 READ MT:FOR LL=1 TO MT
1440 READ M%,T%
1450 POKE 32804,M%
1460 POKE 32801,T%
1470 SYS 32771
1480 NEXT LL
1490 GOSUB 1100
1495 POKE53280,1
1500 WAIT IB+23,127,0
1510 X=INT(TM%(S+1)/256)
1520 POKE IB+24,X:POKE IB+25,TM%(S+1)-X*256
1530 POKE IB+23,0
1535 POKE53280,0
1540 GOSUB 1030
1550 POKE SX+21,0:POKE SX+2,0
1560 RETURN
1570 REM
1580 REM----------SAM----------
```

```
1590 C5=15:C6=8:GOSUB 880
1600 QR=42080:DE=KA:I=1023:GOSUB 660:SYS J3
1610 QR=46152:DE=SC:I=1000:GOSUB 660:SYS J4
1620 C1=14:C2=14:C3=2:C4=10:GOSUB 870
1640 POKE IB+19,3:POKE IB+3,14:POKE IB+2,14:POKE
     IB+1,5:POKE IB,5
1650 POKE IB+33,14:POKE IB+32,14:POKE IB+31,5:POKE
     IB+30,5
1660 GOSUB 1070:SYS MF:POKE MS,10:SYS MO
1670 IF S<>4 THEN 1690
1680 LF=28:RG=39:SE=5:MV=52:GOSUB 3770
1690 WAIT IB+23,127,0
1700 GOSUB 1030
1710 X=INT(TM%(S+1)/256)
1720 POKE IB+24,X:POKE IB+25,TM%(S+1)-X*256
1730 POKE IB+23,0:IF S>2 THEN 1760
1740 POKE IB+6,0:POKE IB+7,0
1750 POKE IB+12,0:POKE IB+13,250
1760 GOSUB 1030:RETURN
1770 REM
1780 REM----------STREET--------------
1790 C5=9:C6=10:GOSUB 880
1800 QR=43104:DE=KA:I=1023:GOSUB 660:SYS J3
1810 QR=47152:DE=SC:I=1000:GOSUB 660:SYS J4
1820 C1=0:C2=5:C3=11:C4=7:GOSUB 870
1830 POKE SX+16,PEEK(SX+16)OR5:POKE SX,100:SYS J6
     :POKE 53275,0
1840 POKE SX+37,0:POKE SX+38,10:POKE SX+39,2:POKE
     SX+23,0:POKE SX+29,6
```

```
1850 POKE IB+19,1:POKE IB+1,0:POKE IB,0
1860 POKE IB+31,5:POKE IB+30,5
1870 IF S>5 THEN GOTO 2020
1880 POKE SY,176:GOSUB 1070:SYS MF:POKE MS,0:SYS MO
1882 POKE SP,SZ+3:POKE SX,66
1884 FOR LL=1 TO 60:SYS J7:TX=1:GOSUB 820:NEXT LL
1890 FOR LL=322 TO 280 STEP -1
1900 POKE SX,LL-256
1910 GOSUB 910
1920 POKE SP,SZ+PN-1
1930 SYS J7:TX=1:GOSUB 820:SYS J7:TX=1:GOSUB 820:SYS J7:TX=1:GOSUB 820
1935 SYS J7:TX=1:GOSUB 820:SYS J7:TX=1:GOSUB 820
1940 NEXT LL:SYS MF:POKE MS,0:SYS MO
1950 FOR LL=176 TO 164 STEP -1
1960 GOSUB 910
1970 POKE SP,SZ+PN+9
1980 POKE SY,LL
1990 SYS J7:TX=1:GOSUB 820:SYS J7:TX=1:GOSUB 820:SYS J7:TX=1:GOSUB 820
1995 SYS J7:TX=1:GOSUB 820:SYS J7:TX=1:GOSUB 820
2000 NEXT LL
2010 GOTO 2780
2020 IF S>7 THEN 2210
2030 POKE SX,24:GOSUB 1070:SYS MF:POKE MS,1:SYS MO
2040 FOR LL=168 TO 176
2050 GOSUB 910
```

```
2060 POKE SP,SZ+PN+14

2070 POKE SY,LL

2080 SYS J7:T%=1:GOSUB 820:SYS J7:T%=1:GOSUB 820:
SYS J7:T%=1:GOSUB 820

2090 NEXT LL

2100 FOR LL=260 TO 214 STEP -1

2110 HI=INT(LL/256):LO=LL-HI*256

2120 IF LO=255 THEN POKE SX+16,PEEK(SX+16)AND254

2130 POKE SX,LO

2140 GOSUB 910

2150 POKE SP,SZ+PN-1

2160 SYS J7:T%=1:GOSUB 820:SYS J7:T%=1:GOSUB 820:
SYS J7:T%=1:GOSUB 820

2170 NEXT LL

2180 POKE SP,SZ+14

2190 FOR LM=1 TO 40:SYS J7:T%=3:GOSUB 820:NEXT LM

2200 GOTO 2780

2210 IF S>9 THEN 2350

2220 POKE SX+16,PEEK(SX+16)AND254:POKE SX,214

2230 POKE SP,SZ+14

2240 POKE SY,176:GOSUB 1070

2250 FOR LM=1 TO 50:SYS J7:T%=3:GOSUB 820:NEXT LM

2260 POKE SP,SZ+20

2270 FOR LM=1 TO 50:SYS J7:T%=3:GOSUB 820:NEXT LM

2280 POKE SP,SZ+14

2290 FOR LM=1 TO 50:SYS J7:T%=3:GOSUB 820:NEXT LM

2300 POKE SP,SZ+21

2310 FOR LM=1 TO 60:SYS J7:T%=2:GOSUB 820:NEXT LM

2320 POKE SP,SZ+14
```

```
2340 GOTO 2780
2350 POKE SX+16,PEEK(SX+16)AND254:POKE SP,SZ+14:POKE SY,176
2360 POKE SX,214:GOSUB 1070:SYS MF:POKE MS,5:SYS MO
2370 FOR LM=1 TO 44:SYS J7:T%=3:GOSUB 820
2380 IF LM=18 THEN C1=10:C2=118:C3=13:C4=120:GOSUB 960
2390 NEXT LM
2400 T%=45:GOSUB 820
2410 POKE SP,SZ+20
2420 T%=45:GOSUB 820
2430 POKE SP,SZ+14
2440 T%=45:GOSUB 820
2450 POKE SP,SZ+21
2460 T%=45:GOSUB 820
2470 POKE SP,SZ+14
2480 T%=30:GOSUB 820
2490 FOR LL=176 TO 103 STEP-1
2500 POKE SY,LL
2510 GOSUB 910
2520 POKE SP,SZ+PN+9
2530 T%=2:GOSUB 820
2540 NEXT LL
2550 POKE SP,SZ+4
2560 T%=90:GOSUB 820
2570 C1=13:C2=120:C3=10:C4=118:GOSUB 960:T%=30:GOSUB 820
2580 FOR LM=1 TO 30:SYS J7:T%=3:GOSUB 820:NEXT LM
2590 POKE SP,SZ+23
```

```
2600 FOR LM=1 TO 22:SYS J7:TX=3:GOSUB 820:NEXT LM
2610 POKE SP,SZ+4
2620 FOR LM=1 TO 17:SYS J7:TX=3:GOSUB 820:NEXT LM
2630 POKE SP,SZ+22
2640 FOR LM=1 TO 22:SYS J7:TX=3:GOSUB 820:NEXT LM
2650 FOR LL=105 TO 49 STEP-1
2660 POKE SX,LL*2
2670 GOSUB 910
2680 POKE SP,SZ+PN-1
2690 SYS J7:TX=1:GOSUB 820:SYS J7:TX=1:GOSUB 820:SYS J7:TX=1:GOSUB 820
2700 NEXT LL
2710 FOR LL=103 TO 92 STEP-1
2720 POKE SY,LL
2730 GOSUB 910
2740 POKE SP,SZ+PN+9
2750 SYS J7:TX=1:GOSUB 820:SYS J7:TX=1:GOSUB 820:SYS J7:TX=1:GOSUB 820
2760 NEXT LL
2770 FOR LM=1 TO 20:SYS J7:TX=3:GOSUB 820:NEXT LM
2780 SYS J7:TX=2:GOSUB 820:IF TMX(S)-TI>30 THEN 2780
2790 WAIT IB+23,127,0
2800 GOSUB 1030
2810 X=INT(TMX(S+1)/256)
2820 POKE IB+24,X:POKE IB+25,TMX(S+1)-X*256
2830 POKE IB+23,0
2840 RETURN
2850 REM
```

```
2860 REM----------LIGHT---------------
2870 C5=15:C6=10:GOSUB 880
2880 QR=44128:DE=KA:I=1023:GOSUB 660:SYS J3
2890 QR=48152:DE=SC:I=1000:GOSUB 660:SYS J4
2900 C1=0:C2=0:C3=2:C4=5:GOSUB 870
2910 POKE IB+19,1:POKE IB+1,0:POKE IB,0
2920 POKE IB+31,0:POKE IB+30,0
2930 GOSUB 1070
2940 POKE SP,SZ+32:POKE 53275,255
2950 POKE SX+16,0:POKE SX,175:POKE SX+29,1:POKE SX+23,1:POKE SX+28,0
2960 POKE SX+39,2:POKE SY,60:POKE SX+21,1:IF S<9 GOTO3000
2970 T%=90:GOSUB 820:POKE SX+39,8:POKE SY,100
2980 T%=90:GOSUB 820:POKE SX+39,5:POKE SY,140
2990 FOR I=0 TO 4:POKE 51899+I,32:NEXT I
3000 WAIT IB+23,127,0
3010 GOSUB 1030
3020 X=INT(TM%(S+1)/256)
3030 T%=255:GOSUB 820
3040 POKE IB+24,X:POKE IB+25,TM%(S+1)-X*256
3050 POKE IB+23,0
3060 RETURN
3070 REM
3080 REM--------TIPS SCREEN------------
3090 FORI=59672TO59679:POKEI,PEEK(I-24):POKEI-24,0:NEXTI
3092 SYS MF:POKE MS,6:SYS MO
3100 POKE 53270,PEEK(53270)AND239:REM- NO LONGER
```

MULTI-COLORED CHARACTERS

3110 POKE 53272,(PEEK(53272)AND240)OR10:REM- CHARACTER SET AT $E800

3120 POKE 53280,0:POKE 53281,0:REM BLACK BACKGROUND

3130 PRINT SPC(44)"■Z[BC01♠♠BCZ]HI♠♠&´BCZ[/T&´♠♠"

3140 PRINTSPC(6)"■&´BCLMJK()23♠♠()RS#!&´"

3150 PRINTSPC(80)"■FG$%↑←&´&´♠♠()PQJK♠♠&´()#%JKJK()"

3160 PRINTSPC(0)"■↑←Z]XY23♠♠BC()♠♠FG↑←$%Z]JK$%&´"

3170 PRINTSPC(80)"■./BCRS()♠♠()RSXYXY♠♠()PQJK♠♠FGBC$%&´"

3180 PRINTSPC(0)"■&´()↑←#!♠♠BCZ]HI♠♠()PQJK♠♠XYRSNOPQ()"

3190 PRINTSPC(0)"■()*+$%Z]&´♠♠NO$%JKJKZ]"

3200 PRINTSPC(80)"■./BCRS()♠♠LM↑←$%♠♠()PQJK♠♠&´RSNOZ]"

3210 PRINTSPC(0)"■()PQBC()♠♠&´BC23&´♠♠/T./BCXYVW/T"

3220 PRINTSPC(80)"■XY↑←↑←VW♠♠DE↑←()PQ♠♠./BC23&´"

3230 PRINTSPC(0)"■DEJKLM↑←$%JK♠♠FG$%↑←&´&´RSZ]NO"

3240 POKE SX+39,7:REM---SPRITE COLOR YELLOW

3250 POKE SX+23,1:POKE SX+29,1

3260 POKE SX+21,1

3270 POKE SX+28,0

3280 POKE SX,0:POKE SX+16,0

3290 GOSUB 1070
3300 FOR Y=2 TO 24
3310 YC=INT(Y*8+37)

```
3320 IF Y=   OR Y=5 OR Y=8 OR Y=9 OR Y=   OR Y=14
OR Y=17 OR Y=18 THEN GOTO 3530
3330 POKE SX+1,YC
3340 FOR X=0 TO 39
3350 XC=INT(X*8)
3360 XX=55296+Y*40+X-2
3370 IF X<2 THEN 3450
3380 POKE XX,10:REM- POKE COLOR RAM PINK
3390 XZ=XX-55296
3400 IF XZ>200 AND XZ<999 THEN POKE XX,6
3410 IF XZ>295 AND XZ<310 THEN POKE XX,7
3420 IF XZ>491 AND XZ<502 THEN POKE XX,5
3430 IF XZ>660 AND XZ<672 THEN POKE XX,13
3440 IF XZ>777 AND XZ<860 THEN POKE XX,2
3450 HI=INT(XC/256):LO=XC-HI*256
3460 POKE SX+16,HI
3470 POKE SX,LO
3480 FOR PN=0 TO 3
3490 POKE SP,SZ+PN+25
3500 FOR I=1 TO 20:NEXT I
3510 NEXT PN
3520 NEXT X
3530 NEXT Y
3540 POKE 53272,(PEEK(53272)AND240)OR8
3550 POKE 53270,PEEK(53270)OR16
3560 POKE SX+16,0:POKE SX+21,0:POKE SX+28,0:POKE SX+23,0:POKE SX+29,0
3570 SYS 49426:RETURN
3580 REM
```

```
3590 REM----------COMPUSYNC------------
3600 IB=34954
3615 POKE IB+23,0
3625 POKE IB+9,0:POKE IB+8,0:POKE IB+7,0:POKE IB+6,0
3635 POKE IB+15,49:POKE IB+14,233:POKE IB+13,250:POKE IB+12,0
3645 POKE IB+21,32:POKE IB+22,200
3655 SYS 32789:REM GET SPACEBAR
3675 ACT=PEEK(32814)*3600+PEEK(32815)*60+PEEK(32816)*6+6-PEEK(32817)
3685 TI$="000000":DIM TM%(24)
3695 AD=ACT/4010
3705 FOR I=0 TO 24:READ X:TM%(I)=AD*X:NEXT I
3715 X=INT(TM%(0)/256)
3725 POKE IB+24,X:POKE IB+25,TM%(0)-X*256
3730 SYS 34722
3740 RETURN
3750 REM
3760 REM-------END COMPUSYNC------------
3770 POKE 51198,LF:POKE 51199,RG
3780 FOR I=0 TO 3:POKE IB+6+I,16:NEXT I
3790 POKE IB+22,0
3800 FOR J=1 TO INT(MV/2)
3810 FOR FS=6 TO 0 STEP-1
3820 POKE IB+18,FS
3830 T%=SE:GOSUB 820
3840 NEXT FS
3850 IF PEEK(IB+22)=1 THEN 3870
```

```
3860 SYS 50600:POKE IB+21,127:GOTO 3890
3870 SYS 50812:POKE IB+21,127
3880 T%=SE:GOSUB 820
3890 NEXT J
3900 FOR I=0 TO 3:POKE IB+6+I,0:NEXT I
3910 POKE IB+18,0
3920 RETURN
3930 REM
3940 REM-----DATA FOR MAX'S WORDS-------
3950 DATA 51
3960 DATA 4,23,1,6,4,8,8,6,2,18,1,6,12,12,1,6,13,8,1,8,12,15,8,23,1,9,8,18
3970 DATA 14,66,12,6,6,6,2,10,1,8,13,10,8,14,13,6,10,6,1,10,2,9,1,5,13,25,14,235
3972 DATA 14,10
3980 DATA 4,9,1,10,9,12,2,15,3,12,12,6,7,9,3,15,13,6,10,8,4,13,2,5,1,5,13,9,1,5
3990 DATA 4,12,6,5,8,20,10,7,13,11,1,14,14,15
4000 DATA 37
4010 DATA 14,22,4,13,1,14,10,5,13,7,1,9,10,11,2,5,8,7,6,5,12,9,8,15,14,100
4020 DATA 3,17,8,11,10,7,13,7,1,5,12,10,8,10,8,6,2,10,8,7,11,9,4,16,10,9,2,60
4030 DATA 1,10,2,14,8,9,10,9,2,9,6,5,10,9,13,12,1,7,14,20
4040 DATA 14
4050 DATA 14,254,4,20,10,5,2,10,1,15,2,75,8,11,10,11,2,4,6,12,10,11,13,9
4060 DATA 1,15,14,45
```

4070 DATA 19

4080 DATA 14,82,4,19,3,9,12,12,10,7,1,9,8,5,9,21,
10,9,13,15,1,15,14,50

4090 DATA 1,5,2,20,8,15,10,12,2,5,6,9,14,75

4100 DATA 9

4110 DATA 14,75,4,20,10,20,10,5,1,5,4,6,7,15,3,25
,14,75

```
START     EQU 34722
          SEI
          LDA #127   TURN OFF TIMER IRQ
          STA 56333
          LDA #01    ENABLE RAS IRQ
          STA 53274
          LDA IRQNO
          INC 780    A REG
          STA INDEX
          LDA RASTBL SET FIRST IRQ
          STA 53266
          LDA 53265  SET MSB TO 0
          AND #127
          STA 53265
          LDA 788
          STA OLDIRQ+1
          LDA 789
          STA OLDIRQ+2
          LDA #<RASIRQ  RESET POINTERS
          STA 788
          LDA #>RASIRQ
          STA 789
```

```
                CLI
                RTS
RASIRQ          LDA 53273
                STA 53273    CLEAR LATCH
                AND #01
                BEQ OVER     NOT RASTER THEN QUIT
                DEC INDEX    SET INTERRUPT NO
                BPL RAS1     NEED TO RESET?
                LDA IRQNO    RESET
                STA INDEX
RAS1            LDX INDEX    GET READY
                LDA BDRTBL
                STA 53280
                LDA BKGTBL
                STA 53281
                LDA SCRTBL
                CMP #$10
                BNE SKIP
                LDA 53270
                AND #248
                ORA FSI      38 COLUMNS
                STA 53270
                JMP SKIP1
SKIP            LDA 53270
                AND #248
                ORA #0       40 COLUMNS
                STA 53270
SKIP1           LDA RASTBL
                STA 53266
```

```
           LDA 53265
           AND #127
           STA 53265
           TXA
           BEQ OVER1
OVER       JMP $FEBC
OVER1      JSR $C009
           LDA FLAG
           CMP #127
           BNE LEAVE
           JSR 51024    COLSCREEN
           LDA #0
           STA FLAG     RESET FLAG
           LDX ALT
           LDA #7
           STA FSI
           LDA 53272
           AND #15
           ORA SCMEM
           STA 53272
           LDA SCED
           STA 648
           CPX #0
           BEQ SWITCH
           LDA #0
           STA ALT
           JMP LEAVE
SWITCH     LDA #1
           STA ALT
```

```
LEAVE       LDX #0   SET UP TIMER TEST
            LDA 161
            CMP TITBL
            BNE OLDIRQ
            INX
            LDA 162
            CMP TITBL
            BNE OLDIRQ
            LDA #127  WAIT FN
            STA WAIT      GIVE BASIC GO SIGNAL
OLDIRQ      JMP $EA31
BDRTBL      BYT $000000000000
SCRTBL      BYT $000000000000
RASTBL      BYT $31FA00000000
FSI         BYT $00
IRQNO       BYT $01
INDEX       BYT $00
FLAG        BYT $00
ALT         BYT $00
WAIT        BYT $00
TITBL       BYT $0000    TIMER TABLE
SCMEM       BYT $3020
SCED        BYT $CCC8
BKGTBL      BYT $000000000000
ORIGIN    = $00AE
DESTIN    = $00B0
R6510     = $0001
DUMMY     = $FFFF
SLOWCLOCK= $00A1
```

```
FASTCLOCK= $00A2

SX        = $D000

SY        = $D001

;
          * = $8000
;
          JMP TIMER   ; J1

JMP MOUTH   ; J2

JMP KATRANS ; J3

JMP SCTRANS ; J4

JMP NOTUSED ; J5

JMP INITCARS; J6

JMP MOVECARS; J7

JMP SYNCHRO ; J8

JMP NOTUSED ; J9
;
R1        * = *+2 ; NUMBER OF BYTES TRANSFERRED

R2        * = *+2 ; UPPER LEFT CORNER OF MOUTH SCREEN
                   MEMORY

R3        * = *+2 ; UPPER LEFT CORNER OF MOUTH COLOR
                   MEMORY

R4        * = *+1 ; JIFFY TIMER VALUE

R5        * = *+2 ; 4TH & 5TH COLORS FOR MULTI-COLOR
                   SCREENS

R6        * = *+1 ; NUMBER OF MOUTH POSITION

Z0        * = *+1

Z1        * = *+1

Z2        * = *+1

Z3        * = *+1
```

```
Z4       * = *+1
Z5       * = *+1
Z6       * = *+1
Z7       * = *+1
Z8       * = *+1
Z9       * = *+1
Z10      * = *+4
;
TABLE    .BYTE 0,132
         .BYTE 64,132
         .BYTE 128,132
         .BYTE 192,132
         .BYTE 0,133
         .BYTE 64,133
         .BYTE 128,133
         .BYTE 192,133
         .BYTE 0,134
         .BYTE 64,134
         .BYTE 128,134
         .BYTE 192,134
         .BYTE 0,135
         .BYTE 64,135
;
KATRANS  LDA R6510
         AND #$FE
         STA R6510
         LDY #$00
         LDA R1+1
         BEQ L2

L1       LDA (ORIGIN),Y
         STA (DESTIN),Y
         INY
         BNE L1
         INC ORIGIN+1
         INC DESTIN+1
         DEC R1+1
         BNE L1
         LDA R1
         BEQ F1
L2       LDA (ORIGIN),Y
         STA (DESTIN),Y
         INY
         CPY R1
         BNE L2
F1       LDA R6510
         ORA #$01
         STA R6510
         RTS
;
SCTRANS  LDA R6510
         AND #$FE
         STA R6510
         LDA #$00
         STA C1+1
         STA C2+1
         LDA #$D8
         STA C1+2
         STA C2+2
```

```
        LDY #$00                        BNE L3
        LDX #$00                        LDA R1
        LDA R1+1                        BEQ F2
        BEQ L4              L4          LDA (ORIGIN),Y
L3      LDA (ORIGIN),Y                  PHA
        PHA                             AND #$7F
        AND #$7F                        STA (DESTIN),Y
        STA (DESTIN),Y                  PLA
        PLA                             AND #$80
        AND #$80                        BEQ S2
        BEQ S1                          LDA R5+1
        LDA R5+1                        CLC
        CLC                             BCC C2
        BCC C1              S2          LDA R5
S1      LDA R5              C2          STA DUMMY,X
C1      STA DUMMY,X                     INX
        INY                             INY
        INX                             CPY R1
        BNE L3                          BNE L4
        INC ORIGIN+1        F2          LDA R6510
        INC DESTIN+1                    ORA #$01
        INC C1+2                        STA R6510
        INC C2+2                        RTS
        DEC R1+1                        ;

MOUTH   LDA R6
                SBC #$01  ; DECREMENT
                ASL A     ; DOUBLE FOR TABLE OFFSET
                TAX
                LDA TABLE,X ; LOOK UP LOW BYTE OF ADDRESS
```

```
STA T1+1

CLC

ADC #$0A  ; ADD 10 FOR COLOR DATA ADDRESS

STA CTABLE+1

INX

LDA TABLE,X  ; GET HIGH BYTE FROM TABLE

STA T1+2
        STA CTABLE+2
        LDA R2
        STA IMAGE+1
        LDA R2+1
        STA IMAGE+2
        LDA R3
        STA CMEM+1
        LDA R3+1
        STA CMEM+2
        LDA #$03
        LDX #$00
T1      LDA DUMMY,X
IMAGE   STA DUMMY,X
CTABLE  LDA DUMMY,X
CMEM    STA DUMMY,X
        INX
        CPX #$0A
        BNE T1
        DEY
        BEQ F3
        LDA IMAGE+1
        CLC
        ADC #$28
        STA IMAGE+1
        LDA IMAGE+2
        ADC #$00
        STA IMAGE+2
        LDA T1+1
        CLC
        ADC #$14
        STA T1+1
        LDA T1+2
        ADC #$00
        STA T1+2
        LDA CMEM+1
        CLC
        ADC #$28
        STA CMEM+1
        LDA CMEM+2
        ADC #$00
        STA CMEM+2
        LDA CTABLE+1
        CLC
        ADC #$14
        STA CTABLE+1
```

```
            LDA CTABLE+2                    ADC #$DD
            ADC #$00                        STA $CBF9
            STA CTABLE+2                    JSR RANDOM
            JMP T1-2                        STX SX+40
F3          JMP TIMER                       STY SX+41
;                                           LDA #$DE
TIMER       LDA FASTCLOCK                   STA $CBFA
            CLC                             LDA #$00
            ADC R4                          STA SX+2
            STA CHECK2+1                    LDA #$4E
            BCC L6                          STA SX+4
            LDA SLOWCLOCK                   LDA SX+16
            ADC #$00                        ORA #$04
            STA CHECK1+1                    AND #$FD
L5          LDA SLOWCLOCK                   STA SX+16
CHECK1      CMP #$00                        LDA #$07
            BNE L5                          STA SX+21
L6          LDA FASTCLOCK                   STA SX+28
CHECK2      CMP #$00                        LDA #$06
            BNE L6                          STA SX+29
            RTS                             LDA #$A0
;                                           STA SY+2
INITCARS    LDA #$01                        LDA #$85
            STA SX+21                       STA SY+4
            LDA FASTCLOCK                   RTS
            AND #$01                 ;
            BEQ CAR                  MOVECARS LDA SX+2
            LDA #$02                        CLC
CAR         CLC                             ADC #$02
```

```
            BCS OVER                         BEQ RANDOM
            STA SX+2                         CMP #$06
            BCC NEXT                         BEQ RANDOM
OVER        LDA SX+16                        CMP #$03
            ORA #$02                         BNE N1
            STA SX+16                        LDA #$07
            LDA #$00              N1         CMP #$04
            STA SX+2                         BNE N2
NEXT        LDA SX+4                         LDA #$09
            SEC                   N2         CMP #$05
            SBC #$02                         BNE N3
            BCC UNDER                        LDA #$0D
            STA SX+4              N3         TAX
            BNE F4                           LDA FASTCLOCK
            LDA SX+16                        AND #$0F
            AND #$04                         LSR A
            BNE F4                           BEQ N3+1
            JMP INITCARS                     CMP #$07
UNDER       LDA #$FE                         BEQ N3+1
            STA SX+4                         CMP #$06
            LDA SX+16                        BEQ N3+1
            AND #$FB                         CMP #$03
            STA SX+16                        BNE N4
F4          RTS                              LDA #$07
;                                 N4         CMP #$04
RANDOM      LDA FASTCLOCK                    BNE N5
            AND #$07                         LDA #$09
            BEQ RANDOM            N5         CMP #$05
            CMP #$07                         BNE N6
```

```
            LDA #$0D
N6   TAY
     RTS
;
NOTUSED  CLC
;
SYNCHRO  JSR $FFE4
         CMP #32
         BNE SYNCHRO
         STA $DC0B
         LDA FASTCLOCK
         STA Z8
         LDA SLOWCLOCK
         STA Z7
         LDA SLOWCLOCK-1
         STA Z6
         LDA $DC0A
         STA Z3
         LDA $DC09
         STA Z4
         LDA $DC08
         STA Z5
         LDX #$00
A3       LDY #$00
A2       LDA $DC08
         CMP Z5
         BNE A1
         INY
         CPY #$FF
```

```
         BNE A2
         INX
         CPX #$FF
         BNE A3
A1       LDA FASTCLOCK
         CMP Z8
         BPL A4
         TAX
         LDA #$FF
         SBC Z8
         ADC $030D
         JMP A5
A4       SBC Z8
A5       STA Z9
         LDA #>Z10
         STA $00FE
         LDA #<Z10
         STA $00FD
         LDY #$00
         LDA Z3
         JSR B1
         LDA Z4
         JSR B1
         LDA Z5
         JSR B1
         LDA Z9
         STA (ORIGIN),Y
         RTS
B1       PHA
```

```
AND #$OF

STA Z0

PLA

AND #$F0

LSR A

STA Z2
```

```
LSR A

LSR A

CLC

ADC Z2

ADC Z0

STA (ORIGIN),Y

INY
```

What is claimed is:

1. A method for synchronous presentation of independent audio program and video program generated by a digital computer, comprising:
   a. providing an audio recording to an independent audio playback device, said audio recording comprising at least two consecutive cue tones at known original intervals, followed by an audio program commencing at a known original commencement interval after a last one of said consecutive cue tones;
   b. providing a database to said computer comprising at least said known original cue tone intervals, said known original commencement interval, and a plurality of original video graphics event intervals for a video program comprising a plurality of videographics events to be synchronized with said audio program;
   c. starting said audio playback device to play said recording;
   d. initiating an interval timer in said computer when one of said cue tones is played;
   e. stopping said interval timer in said computer when a next subsequent one of said cue tones is played, and determining an actual time interval between said cue tones as played on said audio playback device;
   f. repeating steps d and e for each of said known original intervals between said cue tones;
   g. calculating in the computer a ratio R equal to the actual cue tone interval divided by the corresponding original cue tone interval;
   h. initiating said interval timer and waiting an actual commencement interval equal to the original commencement interval multiplied by R; and
   i. repeatedly initiating said interval timer, and display video graphics events, at actual video graphics event intervals corresponding to said original video graphics event intervals multiplied by R.

2. A method for synchronous presentation as claimed in claim 1, wherein step d further comprises indicating to said computer that said cue tones have been played by way of a keyboard of said computer; and wherein step e further comprises indicating to said computer that said cue tone has been played by way of said keyboard of said computer.

3. A method for synchronous presentation as claimed in claim 1, wherein said audio playback device is a cassette tape player.

4. A method for synchronous presentation as claimed in claim 1, wherein said audio playback device is an open-reel tape player.

5. A method for synchronous presentation as claimed in claim 1, wherein said independent audio playback device is a phonograph record player.

6. A method for synchronous presentation as claimed in claim 1, wherein said independent audio playback device is a compact disk player.

7. A method for synchronous presentation as claimed in claim 1, wherein said step b further comprises providing upper and lower response limits to said computer, and further comprising a step after step e of displaying a response report when said actual interval between said cue tones exceeds said original interval between said cue tones by said response limits.

8. A method for synchronous presentation as claimed in claim 1, wherein said cue tones comprise packets of cue tones, and wherein said computer is provided with known original intervals between said packets and measures actual intervals between said packets.

9. A method for synchronous presentation of independent audio program and video program generated by a digital computer, comprising:
   a. playing an audio signal comprising at least two consecutive cue tones at known original intervals, followed by an audio program connecting at a known original commencement interval after a last one of said consecutive cue tones;
   b. providing a database to said computer comprising at least said known original cue tone intervals, said known original commencement interval, and a plurality of original video graphics event intervals for a video program comprising a plurality of videographics events to be synchronized with said audio program;
   c. timing in said computer, actual cue tone intervals between said cue tones corresponding in number to said known original cue tone intervals;
   d. calculating in the computer a ratio R equal to the actual cue tone interval divided by the corresponding original cue tone interval;
   e. waiting an actual commencement interval equal to the original commencement interval multiplied by R; and
   f. displaying video graphics events, at actual video graphics event intervals corresponding to said original video graphics event intervals multiplied by R.

10. A method for synchronous presentation as claimed in claim 9, wherein step c further comprises indicating to said computer that said cue tones have been played by way of a keyboard of said computer.

11. A method of synchronous presentation as claimed in claim 9, wherein said audio signal is played on a cassette tape player.

12. A method for synchronous presentation as claimed in claim 9, wherein said audio signal is played on an open-reel tape player.

13. A method for synchronous presentation as claimed in claim 9, wherein said audio signal is played on a phonograph record player.

14. A method for synchronous presentation as claimed in claim 9, wherein said audio signal is played on a compact disk player.

15. A method for synchronous presentation as claimed in claim 9, wherein said step b further comprises providing upper and lower response limits to said computer, and wherin step c further comprises displaying a response report when said actual interval between said cue tones exceeds said original interval between said cue tones by said response limits.

16. A method for synchronous presentation as claimed in claim 9, wherein said cue tones comprise packets of cue tones, and wherein said computer is provided with known original intervals between said packets and measures actual intervals between said packets.

* * * * *